A. R. MEBANE.
SPRING TRAP.
APPLICATION FILED AUG. 11, 1913.
1,077,850.
Patented Nov. 4, 1913.
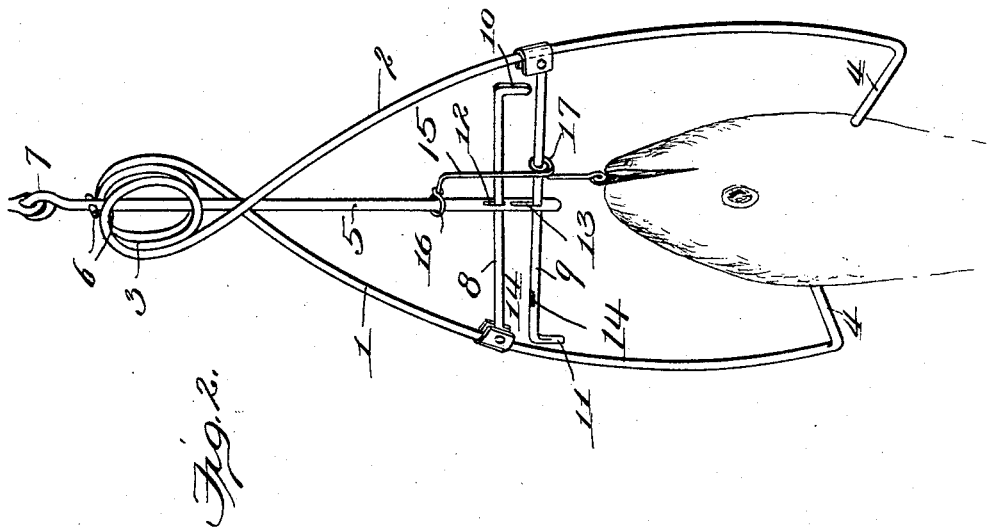
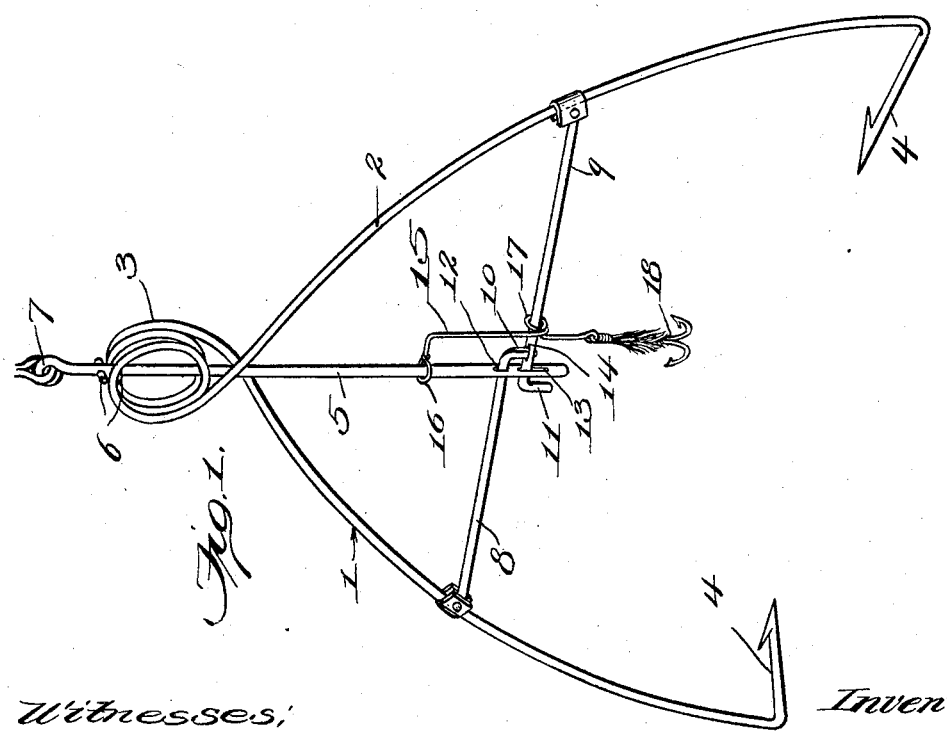
Witnesses:
Inventor
Alexander R. Mebane
by James L. Norris,
Attorney

UNITED STATES PATENT OFFICE.

ALEXANDER R. MEBANE, OF HICKORY FLAT, MISSISSIPPI.

SPRING-TRAP.

1,077,850.     Specification of Letters Patent.     Patented Nov. 4, 1913.

Application filed August 11, 1913. Serial No. 784,197.

*To all whom it may concern:*

Be it known that I, ALEXANDER R. MEBANE, a citizen of the United States, residing at Hickory Flat, in the county of Benton and State of Mississippi, have invented new and useful Improvements in Spring-Traps, of which the following is a specification.

This invention has reference to spring traps, and it proposes, briefly, an improved implement of the general character indicated which may be employed with equal facility for catching both fish and small animals, the improvements in question relating more particularly to the trigger or analogous device for holding the impaling jaws in expanded position, and to the means for tripping the same when the bait is seized.

An embodiment of the invention is illustrated in the accompanying drawings, in which—

Figures 1 and 2 are perspective views of the implement in set and sprung positions, respectively, the implement being shown as utilized as a fish-hook.

The improved implement comprises, primarily, the following main parts or devices, viz:—a pair of impaling jaws, a support by which said jaws are carried, a trigger for holding the jaws in expanded position, and a trip for said trigger.

The jaws 1 and 2 are formed from a single strip of spring wire, the central portion 3 of which is coiled, as shown, so as to exert a torsion action upon the jaws and cause the same to tend to move inwardly or toward each other, the jaws themselves being curved slightly outward and having barbed, in-bent terminals or impaling prongs 4. The support which carries these jaws is here shown as constituted by a rod 5 which passes vertically between the upper ends of the jaws and, also, between the central convolutions of spring 3, and is attached to said spring in any suitable manner, as, for instance, by a pin-and-washer 6, or like, connection, which engages the tops of the convolutions. At its upper end, the supporting rod is provided with an eye 7, by which it may be secured to the line. To hold the jaws in expanded, or operative position, the afore-mentioned trigger is provided, and this device preferably consists, as shown, of a pair of inter-engageable links or arms 8 and 9, which are pivoted at their outer ends to the central portions of said jaws. These arms are of sufficient length to extend past each other when the trap is set, and they are formed at their inner ends with depending fingers 10 and 11. Said arms are guided by their passage through a pair of openings 12 and 13 formed transversely through rod 5 adjacent its lower end, the lower opening 13 being long enough to permit an appreciable pivotal movement of arm 9. The inter-engagement of the two arms is produced, in the present instance, by providing an opening 14 in arm 9, adjacent its finger 11, for the reception of the finger 10 on arm 8, such engagement being maintained by the tension of the jaws. These fingers 10 and 11 also serve to prevent the complete disengagement of their respective arms from rod 5.

The trap is sprung by releasing finger 10 from engagement in opening 14, and this is preferably effected by forcing arm 9 to swing downward, such movement being produced through the agency of a device which performs the combined functions of a trip and a bait holder. In the construction illustrated, the aforesaid device is made from a single strand of wire 15 which is loosely engaged at its upper end with rod 5 and intermediate its ends with arm 9, being provided for that purpose with eyes 16 and 17 through which the parts in question loosely pass. At the lower end of this wire is arranged the hooked bait holder 18, the form of such part depending upon the use to which the implement is to be put; in the present instance, the holder consists of a suitably feathered or bearded "fly".

The manner in which the trap is sprung is believed to be apparent from the foregoing, and, accordingly, no explanation thereof is deemed necessary beyond the statement that when the bait holder is seized by the fish, the pull exerted thereon will cause a downward swinging movement of arm 9, which will result in the release of finger 10 from opening 14, whereupon, the spring jaws will fly inward and impale the fish, as indicated in Fig. 2.

While the invention has been shown and described as utilized as a fish-hook, it is to be understood that no essential limitation to such use is contemplated, since, as originally stated, the invention is susceptible of being employed as a trap for small animals.

I claim as my invention:—

1. In a trap of the character specified, the combination, with a pair of coöperating jaws, and a closing spring connected therewith; of a trigger for holding the jaws in expanded position comprising a pair of members carried by said jaws for releasable engagement with each other; a supporting rod with which said jaws are engaged provided with guides for said members; and a trip connected with one of said members, for releasing the same from such engagement, to spring the trap.

2. In a trap of the character specified, the combination, with a pair of coöperating jaws, and a closing spring connected therewith; of a trigger for holding the jaws in expanded position comprising a pair of members carried by said jaws for releasable engagement with each other; a supporting rod with which said jaws are engaged provided with a pair of guide openings for the extension of said members therethrough; and a trip connected with one of said members for releasing the same from such engagement, to spring the trap.

3. In a trap of the character specified, the combination, with a pair of coöperating jaws, and a closing spring connected therewith; of a trigger comprising a pair of members carried by said jaws, one of said members having an opening, and the other member having a finger for releasable engagement in said opening, to hold said jaws in expanded position; and means for releasing said finger from such engagement, to spring the trap.

4. In a trap of the character specified, the combination, with a pair of coöperating jaws, and a closing spring connected therewith; of a trigger comprising a pair of arms pivoted at their outer ends to said jaws and having their inner ends extending past each other and provided with means for releasably engaging each other, to hold said jaws in expanded position; and a trip connected with one of said arms for swinging the same in one direction, to release it from such engagement and spring the trap.

5. In a trap of the character specified, the combination, with a pair of coöperating jaws, and a closing spring connected therewith; of a trigger comprising a pair of arms pivoted at the outer ends to said jaws and having their inner ends extending past each other, one of said arms being provided adjacent its inner end with an opening, and the other arm with a finger releasably engaged therein; and a trip connected with one of said arms for swinging the same in one direction, to release said finger from such engagement and spring the trap.

6. In a trap of the character specified, the combination, with a pair of coöperating jaws, and a closing spring connected therewith; of a trigger comprising a pair of arms pivoted at their outer ends to said jaws and having their inner ends extending past each other, one of said arms being provided adjacent its inner end with an opening, and the other arm with a finger releasably engaged therein; a supporting rod by which said jaws are carried provided with guides for the reception of said arms; and a trip connected with one of said arms for swinging the same in one direction, to release said finger from such engagement and spring the trap.

7. In a trap of the character specified, the combination, with a pair of coöperating jaws, and a closing spring connected therewith; of a trigger comprising a pair of arms pivoted at their outer ends to said jaws and having their inner ends extending past each other, one of said arms being provided adjacent its inner end with an opening, and the other arm with a finger releasably engaged therein; a supporting rod by which said jaws are carried provided with a pair of guide openings for the extension of said arms therethrough; and a trip connected with one of said arms for swinging the same in one direction, to release said finger from such engagement and spring the trap.

In testimony whereof I have hereunto set my hand in presence of subscribing witnesses.

ALEXANDER R. MEBANE.

Witnesses:
J. T. ABSTON, Jr.,
W. W. ROSS,
W. M. MATTHEWS.

---

Copies of this patent may be obtained for five cents each, by addressing the "Commissioner of Patents, Washington, D. C."